Jan. 24, 1950
C. M. WOLF
2,495,562
SCALE-LIGHT SWITCH
Filed April 22, 1949
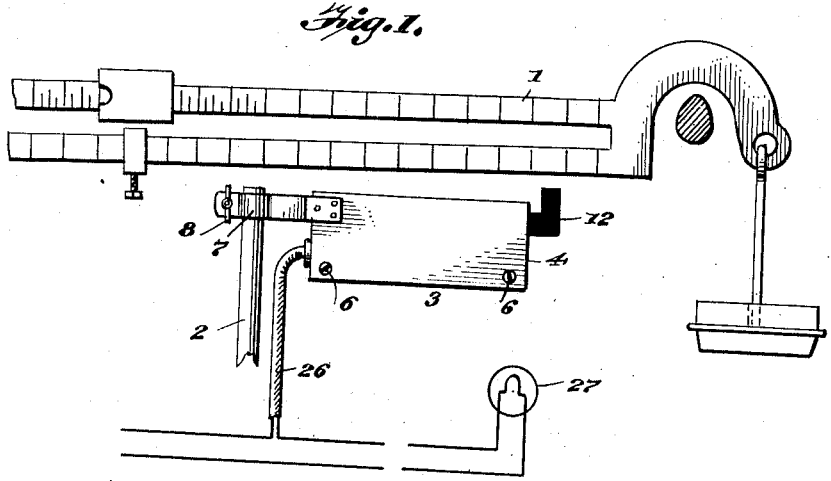
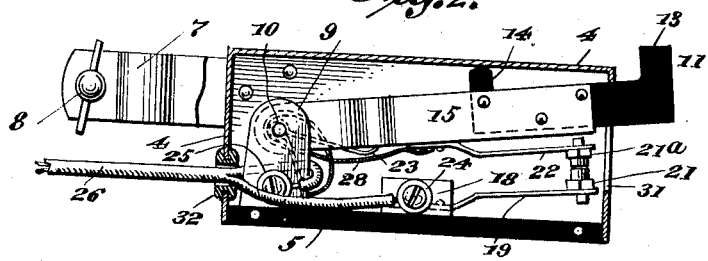
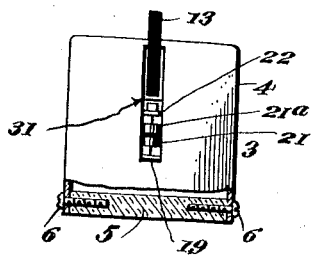
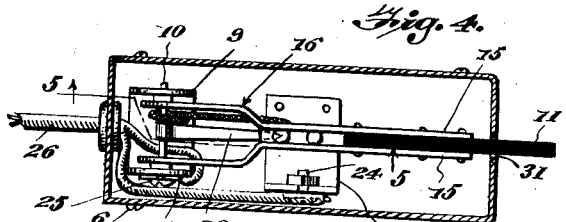
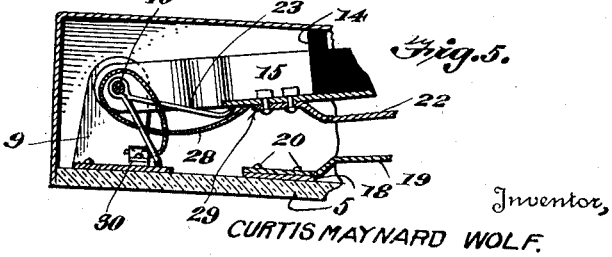
Inventor,
CURTIS MAYNARD WOLF.
By E. E. Vrooman & Co.,
His Attorneys.

Patented Jan. 24, 1950

2,495,562

UNITED STATES PATENT OFFICE 2,495,562

SCALE-LIGHT SWITCH

Curtis Maynard Wolf, Greenville, Ohio

Application April 22, 1949, Serial No. 89,130

1 Claim. (Cl. 200—85)

This invention relates to a scale-light switch.

An object of the invention is the construction of a simple and efficient switch which is particularly adapted to be applied to or associated with scales for weighing heavy loads, whereby the driver of the motor vehicle, when loading, will know that the correct weight is on the motor vehicle.

It is to be understood that in handling material such as coal, the drivers of the motor vehicles are given instructions as to the amount to be loaded on their trucks, and scales are set accordingly. For example, if the driver is ordered to put on a ton and his truck weighs forty-eight hundred pounds, this will make a total weight of sixty-eight hundred pounds, and the scales are set for that amount. If, when the driver drives upon the scales, his load is light, the scale beam will rest on the lever unit of my device, closing the switch and lighting the light or bulb, whereupon the driver can load on until the light goes out, by reason of the circuit being broken, and then the driver will know that he has the proper load or weight on his truck. If, when the truck is overloaded, no light appears, the driver will proceed to unload the truck until the light burns. This switch operates at the slightest downward stroke of the scale beam, the switch being very sensitive.

I have found from experience that without a switch of this type, the drivers depend upon the weigher to tell them when they have the proper amount, and so often attention is taken from the scales, by reason of interruptions, such as answering the telephone or a customer coming into the office. Therefore, the driver does not have to depend upon the weigher's attention, for he can watch the signal light or bulb, which will be positive in action, indicating the exact condition of the load on the truck, consequently, my improved switch greatly simplifies the office work in a coal office, and the like.

These application papers are duplicates of my former application, Serial No. 337,555, filed May 27, 1940 and allowed December 11, 1940 and now abandoned.

With the foregoing and other objects in view, the invention comprises certain novel constructions, combinations, and arrangements of parts as will be hereinafter described, illustrated in the accompanying drawings, and more particularly pointed out in the appended claim.

In the drawings:

Figure 1 is a view in side elevation of a switch constructed in accordance with the present invention, showing the same associated with a scale beam.

Figure 2 is an enlarged longitudinal sectional view of the casing of the switch, showing the mechanism contained therein.

Figure 3 is a view in front elevation, showing the base in transverse section.

Figure 4 is a horizontal sectional view of the casing, showing the mechanism therein in top plan.

Figure 5 is an enlarged sectional view on line 5—5, Figure 4, and looking in the direction of the arrows.

Referring to the drawings, in which I have shown the preferred embodiment of my invention, 1 designates a scale beam of any standard type, contiguous to which is a suitable support 2. My improved switch 3 is carried by said support 2, as hereafter specifically described, with a portion of said switch directly under the scale beam 1.

The switch 3 comprises a metallic casing 4, which is provided with a detachable bottom or base 5. The base 5 is formed of any suitable insulating material, and is held in place within casing 4 by means of screws 6.

Extending from one end of casing 4 is a clamp 7, which fits upon support 2 (Fig. 1), and by a manually operated means 8 the clamp 7 is retained in a fixed position upon a support 2. By means of clamp 7 the casing 4 can be adjusted with a nicety with respect to scale beam 1.

A U-shaped bracket 9 is fastened upon base 5, near one end thereof, and a pin 10 extends through the upper portions of bracket 9. The lever unit 11 is pivotally mounted on pin 10. This lever unit 11 comprises an outer contact piece 12; this contact piece 12 is formed entirely of insulating material. The contact piece 12 is provided at its outer end with an upwardly extending portion 13 and is also provided with an upwardly extending portion 14 at its inner end. This contact piece 12 is mounted or secured between parallel metallic bars 15 (Fig. 4), which bars are integrally connected at the lower edges (Fig. 3), and their inner ends spread out, constituting a bifurcated end 16, which is mounted on pin 10. Washers 17 are on pin 10, against the side portions of bracket 9, and said washers also engage the bifurcated end 16 of the lever unit 11.

An angle plate 18 is secured to base 5 and a lower spring finger 19 is fastened at 20 to said angle plate 18. The lower spring finger 19 is bent slightly upward, and at its outer end is provided with a contact 21. Secured to the bottom of the integral bars 15 is an upper spring finger 22, as clearly seen in Figs. 2 and 5. This finger 22 is bent slightly downward, and carries a contact 21a near its outer end. The contacts 21 and 21a are normally separated a very slight distance, whereby a very slight downward movement of the lever 11 will cause the circuit to be closed through the contacting units 21 and 21a.

A V-shaped spring 23 is mounted at its narrowest end, securely upon pin 10 (Fig. 5). The lower end of spring 23 presses normally upon the bracket 9, while the upper end presses upon the closed or bottom part of the parallel bars 15 (Fig. 5). By this arrangement and construction, pressure is normally exerted upwardly on the lever unit 11, whereby the circuit is broken between the contacts or units 21 and 21a. It has been found that fingers 19 and 22 will work on about ten thousandths of an inch stroke, whereby a great saving is obtained in selling goods, such as coal.

A terminal 24 is mounted upon the angle plate 18, and a terminal 25 is mounted upon the U-shaped bracket 9; to these terminals 24 and 25 are fastened the ends of wires in the cable 26; the wires of this cable are suitably connected to the signal bulb 27, whereby when the circuit is broken through the switch, the bulb will not burn, but when the circuit is closed through the switch, then the bulb will burn, giving a signal to the driver.

To make the flow of the current positive, a wire 28 is mounted within the bracket 9, one end of the wire being soldered, or otherwise secured, at 29 to the inner end of the upper spring finger 22, while its opposite end is secured to clip 30, Fig. 5.

It is to be noted that the parallel bars 15 constitute a substantially U-shaped unit with an inner bifurcated end. Further, that the contact piece 12 works in a vertical slot 31, formed in the outer end of casing 4. The entire mechanism can be removed from the casing 4, by first removing the screws 6, and then drawing downward on the base 5, which base carries said mechanism. As the base and its associated parts are removed from casing 4, the cable 26 will be threaded inwardly through the eye 32, permitting this movement of the parts.

In assembling the switch 3, in conjunction with the scale beam 1, the main feature to be borne in mind is to cause the upwardly extending end 13 to register accurately with the lower edge of beam 1. When this has been done, if the beam moves downwardly into contact with the end 13, and continues this downward movement, the lever 11 will move downwardly thereby closing contacts 21 and 21a, whereupon the signal light 27 will be operated or cause to burn. When the proper load has been placed upon the truck, that is, resting upon the scales, the scale beam 1 will rise at its outer end, breaking contact with the lever unit 11, and through the action of spring 23, the contact of the two units 21 and 21a will be broken, resulting in the signal light 27 going out, or not burning.

It is to be understood that fingers 19 and 22 are formed of suitable springy metal, and that these fingers are of an angular construction, whereby they extend inwardly towards each other from their inner ends.

While I have described the preferred embodiment of my invention and illustrated the same in the accompanying drawings, certain changes or alterations may appear to one skilled in the art to which this invention relates during the extensive manufacture of the same, and I, therefore, reserve the right to make such changes or alterations as shall fairly fall within the scope of the appended claim.

What I claim is:

In a switch of the class described, the combination of a casing provided with a detachable insulated base, said casing provided with a slot in one end, a U-shaped bracket within said casing and fastened to said base, an angle bracket within said casing and fastened to said base, a lower spring finger fastened at its inner end to said angle bracket, a lever unit including parallel integral bars and an insulated contact piece, said contact piece secured partly between said parallel bars, said parallel bars being spread outwardly at their inner ends, said inner ends positioned within said U-shaped bracket, a pin extending through portions of said U-shaped bracket and portions of said inner ends of the parallel bars, washers on said pin between portions of the U-shaped bracket and portions of the inner end of said bars, a V-shaped spring fastened at its inner end upon said pin and having its lower end engaging said U-shaped bracket and its upper end engaging the bottom of said parallel bars, said insulated contact piece provided with an outer upwardly extending end and an inner upwardly extending end, said inner upwardly extending end normally engaging the top portions of said casing, and an upper spring finger fastened at its inner end to the bottom portions of said bars and being adapted to contact with said lower spring finger, for closing a circuit.

CURTIS MAYNARD WOLF.

No references cited.